United States Patent
Seyedsalehi et al.

(10) Patent No.: US 11,607,927 B2
(45) Date of Patent: Mar. 21, 2023

(54) ENHANCED VEHICLE OPERATION

(71) Applicant: Ford Global Technologies, LLC, Dearborn, MI (US)

(72) Inventors: Sajjad Seyedsalehi, Ann Arbor, MI (US); Vasiliy Krivtsov, Ann Arbor, MI (US); William S. Johnston, South Lyon, MI (US); Thomas Anthony Montgomery, Plymouth, MI (US); Kevin Michael Swenskowski, Dearborn Heights, MI (US); Anatoliy Dubovitskiy, Huntington Woods, MI (US); Mahtab Jahanbani Fard, Grosse Pointe Park, MI (US); Judy Jin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 17/073,765

(22) Filed: Oct. 19, 2020

(65) Prior Publication Data
US 2022/0118823 A1    Apr. 21, 2022

(51) Int. Cl.
 *B60H 1/32*  (2006.01)
 *B60H 1/00*  (2006.01)
 *B60W 10/30*  (2006.01)
(52) U.S. Cl.
 CPC ............. *B60H 1/32* (2013.01); *B60H 1/0073* (2019.05); *B60H 1/00764* (2013.01);
 (Continued)
(58) Field of Classification Search
 CPC .... B60H 1/32; B60H 1/0073; B60H 1/00764; B60H 1/3205; B60H 2001/3248;
 (Continued)

(56) References Cited

U.S. PATENT DOCUMENTS 7,444,251 B2    10/2008 Nikovski et al.
10,958,410 B2 *  3/2021 Rohde ................... H04L 7/0083
(Continued)

FOREIGN PATENT DOCUMENTS

WO    2019171840 A1    9/2019

OTHER PUBLICATIONS

Tassou, S.A., "Fault Diagnosis and Refrigerant Leak Detection in Vapour Compression Refrigeration Systems," ScienceDirect, International Journal of Refrigeration, vol. 28, Issue 5, Aug. 2005, pp. 680-688.

*Primary Examiner* — Marc E Norman
*Assistant Examiner* — Matthew John Moscola
(74) *Attorney, Agent, or Firm* — Vichit Chea; Bejin Bieneman PLC (57) ABSTRACT

A computer includes a processor and a memory, the memory storing instructions executable by the processor to collect (a) ambient weather data, (b) vehicle speed data including at least one of a vehicle speed or an engine speed, and (c) operation data of a climate control subsystem of a vehicle, input the collected data to a regression program trained to output a predicted pressure of refrigerant of the climate control subsystem, the regression program trained with previously determined ambient weather data, data of a previous vehicle speed or a previous engine speed, and previous operation data of the climate control subsystem, determine an actual pressure of the refrigerant in the climate control subsystem, and actuate a component upon determining that a difference between the predicted pressure and the actual pressure falls below threshold.

16 Claims, 4 Drawing Sheets

(52) U.S. Cl.
CPC ........... *B60H 1/3205* (2013.01); *B60W 10/30* (2013.01); *B60H 2001/325* (2013.01); *B60H 2001/3248* (2013.01); *B60H 2001/3266* (2013.01); *B60H 2001/3272* (2013.01); *B60H 2001/3273* (2013.01); *B60W 2520/10* (2013.01); *B60W 2555/20* (2020.02)

(58) Field of Classification Search
CPC ...... B60H 2001/325; B60H 2001/3266; B60H 2001/3272; B60H 2001/3273; B60H 1/3225; B60H 1/00585; B60W 10/30; B60W 2520/10; B60W 2555/20; F25B 2500/22; F25B 2500/221; F25B 2500/222
See application file for complete search history.

(56) References Cited

U.S. PATENT DOCUMENTS

| | | | |
|---|---|---|---|
| 2010/0326127 A1* | 12/2010 | Oomura | B60H 1/3208 62/498 |
| 2011/0112814 A1* | 5/2011 | Clark | G01M 3/3227 73/40 |
| 2017/0300046 A1* | 10/2017 | Kerbel | F24F 11/38 |
| 2019/0092130 A1* | 3/2019 | Komura | B60H 1/32 |
| 2019/0248209 A1* | 8/2019 | Ishizeki | B60H 1/32 |
| 2019/0283591 A1* | 9/2019 | Koehler | B60W 10/08 |
| 2021/0018200 A1* | 1/2021 | Watanabe | F24F 11/61 |
| 2021/0179121 A1* | 6/2021 | Lopez | B60W 50/038 |
| 2021/0260957 A1* | 8/2021 | Reed | B60H 3/06 |
| 2021/0390414 A1* | 12/2021 | Schneider | G06N 3/08 |

* cited by examiner

ENHANCED VEHICLE OPERATION

BACKGROUND

A climate control subsystem provides heating and/or cooling to a passenger compartment of a vehicle. The climate control subsystem may operate to cool the passenger compartment by transporting a refrigerant through a heat cycle to absorb heat from the passenger compartment and expel the heat from the vehicle, combined with fans, blowers, and ducts to move air between the passenger compartment and the climate control subsystem. The climate control subsystem may operate as a radiator for an engine of the vehicle to heat the passenger compartment by transferring waste heat from the engine into the passenger compartment.

DETAILED DESCRIPTION

A system includes a computer including a processor and a memory, the memory storing instructions executable by the processor to collect (a) ambient weather data, (b) vehicle speed data including at least one of a vehicle speed or an engine speed, and (c) operation data of a climate control subsystem of a vehicle, input the collected data to a regression program trained to output a predicted pressure of refrigerant of the climate control subsystem, the regression program trained with previously determined ambient weather data, data of a previous vehicle speed or a previous engine speed, and previous operation data of the climate control subsystem, determine an actual pressure of the refrigerant in the climate control subsystem, and actuate a component upon determining that a difference between the predicted pressure and the actual pressure falls below a threshold.

The instructions can further include instructions to retrain the regression program with the collected data and the previously determined data by applying a first weight value to the collected data and a second weight value to the previously determined data, the first weight value being greater than the second weight value.

The instructions can further include instructions to output the predicted pressure based on a plurality of previously predicted pressure differences of the refrigerant of the climate control subsystem.

The instructions can further include instructions to determine each of the plurality of previously predicted pressure differences as a respective average of predicted pressure differences during a previous respective trip, each trip being a time period between activation of the vehicle and deactivation of the vehicle.

The threshold can be based on a standard deviation of the plurality of previously predicted pressure differences from a mean value of the previously predicted pressure differences.

The threshold can be based on a false positive rate of the predicted pressure indicating a leak of the refrigerant in the climate control subsystem.

The instructions can further include instructions to determine the difference between the predicted pressure and the actual pressure based on a predicted false positive rate of the predicted pressure indicating a leak in the climate control subsystem.

The operation data of the climate control subsystem can include a blower fan speed and an evaporation temperature of the refrigerant.

The instructions can further include instructions to determine a baseline pressure difference of the refrigerant of the climate control subsystem based on the previous operation data of the climate control subsystem.

The instructions can further include instructions to update the baseline pressure difference of the refrigerant based on a mean pressure difference between the predicted pressure of the refrigerant and the actual pressure of the refrigerant from activation of the vehicle to deactivation of the vehicle.

The instructions can further include instructions to actuate the component when the difference between the predicted pressure and the actual pressure exceeds the threshold for an elapsed time exceeding a time threshold.

The regression program can be a multivariate adaptive regression spline.

The instructions to actuate the component can include instructions to deactivate a compressor of the climate control subsystem.

A method includes collecting (a) ambient weather data, (b) vehicle speed data including at least one of a vehicle speed or an engine speed, and (c) operation data of a climate control subsystem of a vehicle, inputting the collected data to a regression program trained to output a predicted pressure of refrigerant of the climate control subsystem, the regression program trained with previously determined ambient weather data, data of a previous vehicle speed or a previous engine speed, and previous operation data of the climate control subsystem, determining an actual pressure of the refrigerant in the climate control subsystem, and actuating a component upon determining that a difference between the predicted pressure and the actual pressure falls below a threshold.

The method can further include retraining the regression program with the collected data and the previously determined data by applying a first weight value to the collected data and a second weight value to the previously determined data, the first weight value being greater than the second weight value.

The method can further include outputting the predicted pressure based on a plurality of previously predicted pressure differences of the refrigerant of the climate control subsystem.

The method can further include determining each of the plurality of previously predicted pressure differences as a respective average of predicted pressure differences during a previous respective trip, each trip being a time period between activation of the vehicle and deactivation of the vehicle.

The method can further include determining the difference between the predicted pressure and the actual pressure based on a predicted false positive rate of the predicted pressure indicating a leak in the climate control subsystem.

The method can further include determining a baseline pressure difference of the refrigerant of the climate control subsystem based on the previous operation data of the climate control subsystem.

The method can further include updating the baseline pressure difference of the refrigerant based on a mean pressure difference between the predicted pressure of the refrigerant and the actual pressure of the refrigerant from activation of the vehicle to deactivation of the vehicle.

The method can further include actuating the component when the difference between the predicted pressure and the actual pressure exceeds the threshold for an elapsed time exceeding a time threshold.

The method can further include deactivating a compressor of the climate control subsystem upon determining that the difference between the predicted pressure and the actual pressure falls below the threshold.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Leaks in a climate control subsystem can release refrigerant, reducing an amount of refrigerant available to cool a passenger cabin of the vehicle. Because the refrigerant is compressed to a liquid state and then evaporated to a vapor state during operation of the climate control subsystem, determining an amount of refrigerant can be difficult. That is, directly measuring the actual volume of the refrigerant can be difficult, because the refrigerant has different densities in the liquid state, the vapor state, and a mixed state in which both liquid and vapor refrigerant are present. Further, actuation of specific vehicle components can affect the state of the refrigerant. For example, operation of a compressor of the climate control subsystem can be affected by inputs from an internal combustion engine and ambient weather conditions. For example, an increase in rotation speed of the internal combustion engine can increase a rotation speed of the compressor, compressing the refrigerant to a higher pressure than a default rotation speed of the compressor.

As explained herein, using vehicle speed data, ambient weather data, and operation data of vehicle components can provide a more accurate prediction of a volume of the refrigerant in a climate control subsystem than using a pressure sensor alone to determine the volume of the refrigerant. A vehicle computer can collect the vehicle speed data, ambient weather data, and operation data without additional sensors, and the vehicle computer can predict the volume of the refrigerant without additional dedicated sensors, reducing production costs of the vehicle. Thus, a vehicle computer can be programmed to detect refrigerant leaks in a vehicle climate control subsystem using data otherwise available to the vehicle computer.

Figure 1:
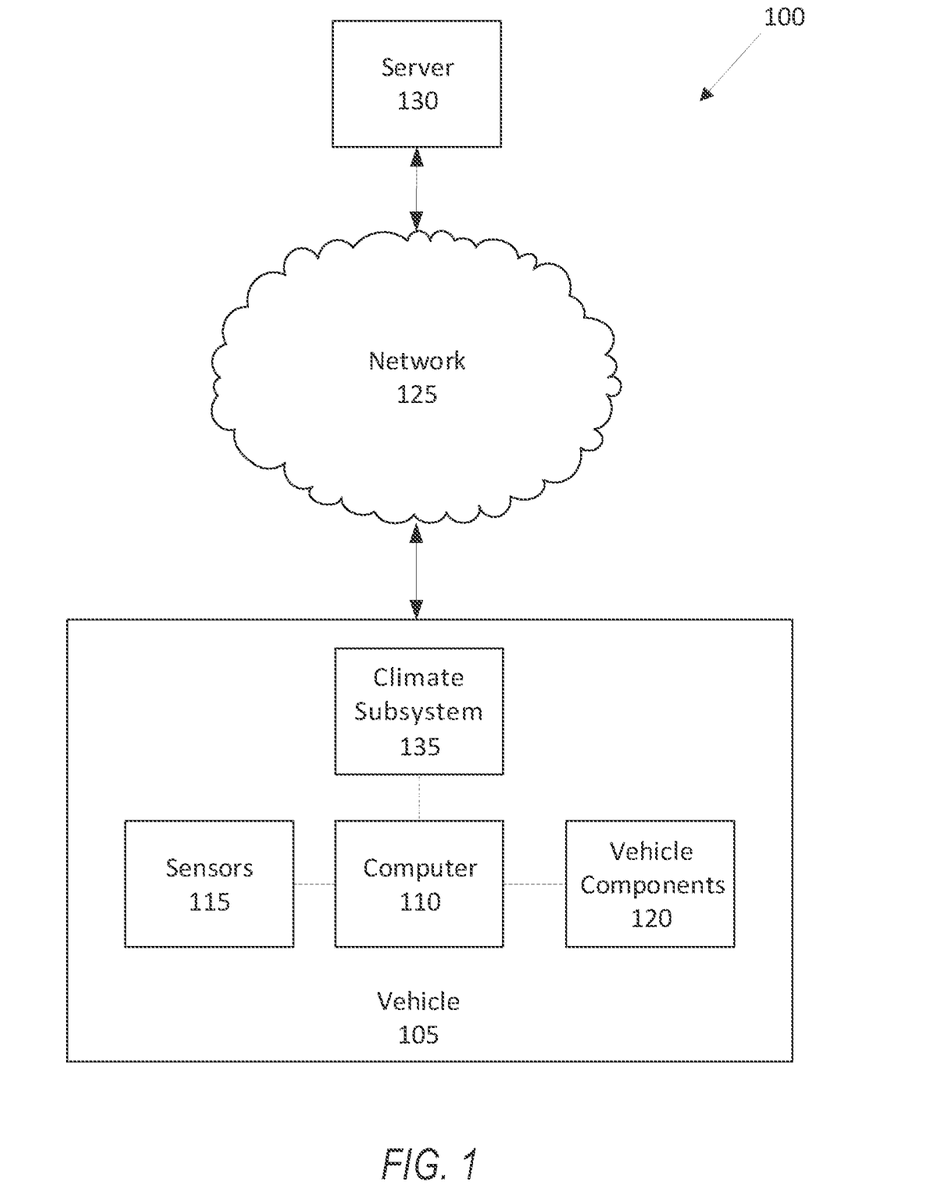
FIG. 1 is a diagram of an example system for detecting leaks in a climate control subsystem.

FIG. 1 illustrates an example system 100 for detecting leaks in a climate control subsystem of a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation-such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle 105 include a climate control subsystem 135. The climate control subsystem 135 controls a temperature of air in a passenger cabin of the vehicle 105. As described below, the climate control subsystem 135 uses a refrigerant to remove heat from the passenger cabin and expel heat to the environment outside of the vehicle 105.

Figure 2:
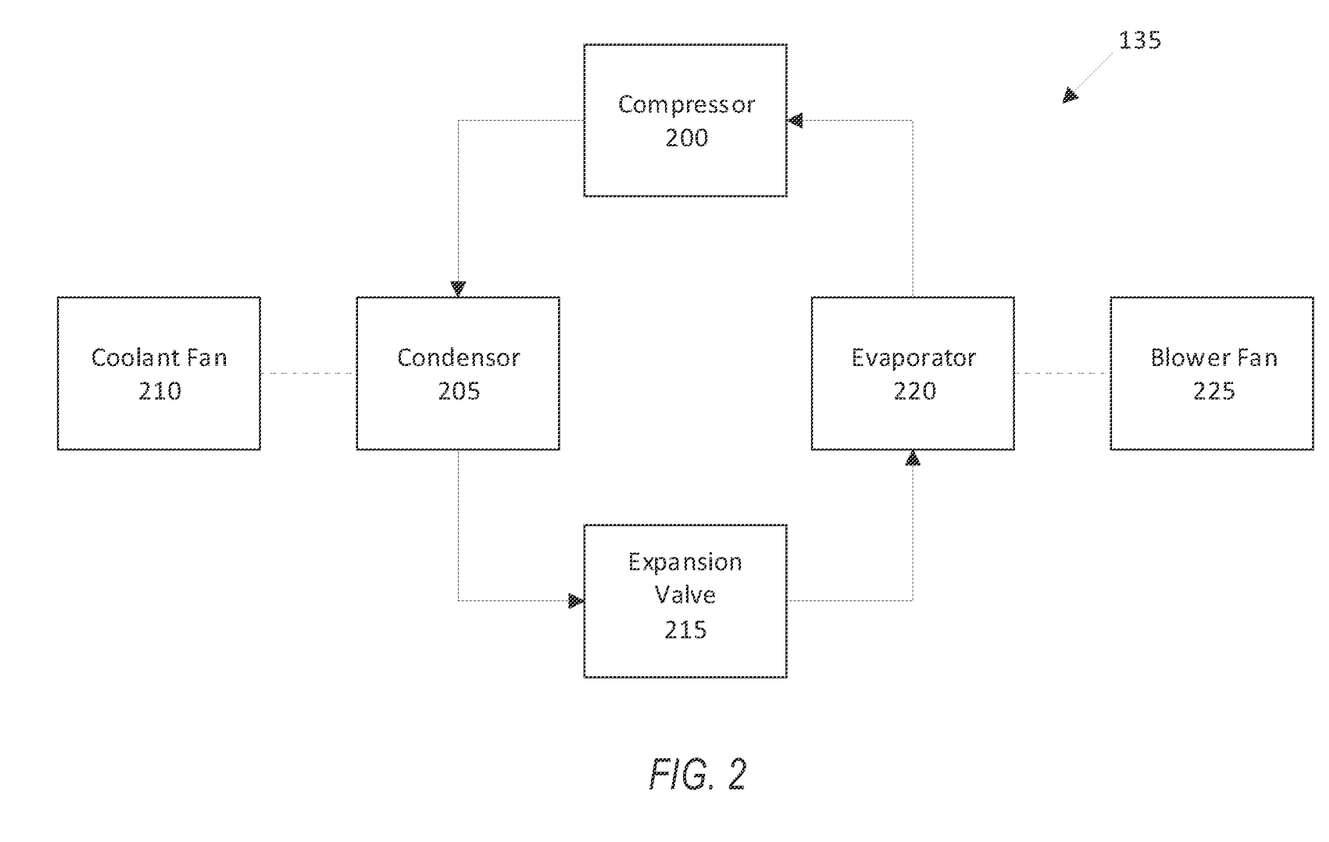
FIG. 2 is a diagram of the climate control subsystem.

FIG. 2 is a diagram of an example climate control subsystem 135. As described above, the climate control subsystem 135 adjusts a temperature of air in the vehicle 105. The computer 110 can actuate the climate control subsystem 135 to provide a specified temperature of the vehicle 105 cabin compartment. The climate control subsystem 135 uses a refrigerant to control the temperature in the vehicle 105. The refrigerant is a chemical that can absorb and release heat in a controlled manner to control the temperature of air in the vehicle cabin. For example, the refrigerant can be cholodifluoromethane (R-22), tetrafluoroethane (R-134), a combination of other chemicals such as R-410A, etc. Because the refrigerant absorbs and releases heat, refrigerant leaks reduce the amount of heat that can be absorbed and released, reducing the effectiveness of the climate control subsystem 135.

The climate control subsystem 135 includes a compressor 200. The compressor 200 compresses refrigerant to a specified pressure. Compressing the refrigerant decreases the volume of the refrigerant and increases the temperature of the refrigerant. The compressor 200 can be, e.g., a screw compressor, a scroll compressor, a centrifugal compressor, etc. The refrigerant enters the compressor 200 in a gas phase. A lubricant such as oil can be added to the refrigerant to lubricate the compressor 200 during operation of the climate control subsystem 135. Thus, when refrigerant leaks from the climate control subsystem 135, the compressor 200 may lack necessary lubrication and may be damaged during operation.

The compressor 200 provides the compressed refrigerant to a condenser 205. The condenser 205 allows the refrigerant to shed heat to ambient air external to the vehicle 105, decreasing the temperature of the refrigerant. That is, the temperature of the compressed refrigerant can be higher than the ambient air temperature external to the vehicle 105, so heat can move from the refrigerant to the ambient air external to the vehicle 105. The condenser 205 includes a tube through which the compressed refrigerant moves. A coolant fan 210 can blow ambient air external to the vehicle 105 over the tube, decreasing the temperature of the tube and the refrigerant by convective cooling. The air heated by the tube can be expelled from the vehicle 105. As the refrigerant cools in the condenser 205, the refrigerant condenses into a liquid phase (i.e., state).

The condenser 205 provides the cooled refrigerant to an expansion valve 215. The expansion valve 215 lowers the pressure of the liquid refrigerant, causing a drop in the temperature of the refrigerant after leaving the expansion valve 215. The expansion valve 215 provides the cooled refrigerant to an evaporator 220. The expansion valve 215 restricts flow of the refrigerant into the evaporator 220, decreasing the pressure of the refrigerant. The evaporation of the refrigerant decreases the temperature of the evaporator 220. That is, as the pressure of the refrigerant decreases, the evaporation temperature of the refrigerant decreases and the refrigerant absorbs energy to evaporate to the gas phase, and the temperature of the evaporator 220 decreases. Thus, the temperature of the refrigerant in the evaporator 220 is lower than the temperature of the ambient air in the vehicle 105. The evaporator 220 includes a tube through which the cooled refrigerant moves. A blower fan 225 blows air internal or external to the vehicle 105 across the cooled tubes, cooling the air. The cooled air is provided to the passenger cabin of the vehicle 105, cooling the air in the vehicle 105. The heated refrigerant moves to the compressor 200 to be compressed.

The computer 110 can detect a leak of refrigerant in the climate control subsystem 135. A "leak" is any damaged portion of the climate control subsystem 135 through which refrigerant leaves the climate control subsystem 135. When refrigerant leaks from the climate control subsystem 135, the climate control subsystem 135 is less effective at cooling the passenger cabin of the vehicle 105 than when the climate control subsystem 135 has no leaks. Detecting leaks early can prevent excessive release of refrigerant into environment, damage to the compressor 200, and/or decrease maintenance costs of the climate control subsystem 135.

The computer 110 can collect operation data of the climate control subsystem 135. In this context, "operation data" is data about one or more parts of the climate control subsystem 135. The operation data can include, e.g., a pressure of refrigerant exiting the compressor 200, a speed of the blower fan 225, a speed of the coolant fan 210, an evaporation temperature of the refrigerant, a temperature of air external to the vehicle 105, a specified target temperature, etc.

The computer 110 can collect vehicle speed data. The vehicle speed data can include a wheel speed of the vehicle 105 as measured by a speedometer and an engine speed of a propulsion of the vehicle 105. The speed data can be used to detect the leak. The rotation of the propulsion can affect performance of the compressor 200 and thus the engine speed can affect operation of the compressor 200. The vehicle speed can affect air flow under a hood of the vehicle 105, affecting heat transfer from the condenser 205 to the ambient air external to the vehicle 105.

The computer 110 can collect ambient weather data. In this context "ambient weather data" are environmental weather data of a geographic area around the vehicle 105. The ambient weather data can include, e.g., an air temperature, a precipitation level, a type of precipitation, an insolation (i.e., an amount of sunlight), etc. The computer 110 can thus use the ambient weather data to identify a leak in the climate control subsystem 135, as described below.

The computer 110 can generate a regression program based on the collected data. A "regression program" is an algorithm that correlates a change in one or more variables with a change of a predicted response variable. A "response variable" is a specified output of the regression program, e.g., pressure of the climate control subsystem 135. That is, the regression program determines the dependence between two or more variables and their interactive effects on the predicted response variable. The computer 110 can generate the regression program to predict the pressure of the refrigerant based on one or more input variables. Transformed independent variables of Principle Components (PCs) can subset previously collected data, i.e., "historical" data. The PCs can be obtained by using a conventional technique such as a principal component analysis (PCA) transform of collected vehicle speed data, operation data, and ambient weather data.

The regression program can be a multivariate adaptive regression spline algorithm. A multivariate adaptive regression spline predicts a change in an output based on weighted sum of linear functions:

$$P = \sum_i \sum_j c_j^i B_j^i(X_i) \quad (1)$$

where P is the pressure of the refrigerant, $c_j^i$'s are coefficient values and $B_j^i$'s are hinge basis functions. A "hinge basis function" is a function that outputs only a portion of another function beyond a specified point, called a "knot": $B_j^i(X_i) = [\pm(X_i - a_j^i)]_+$ where $a_j^i$ is the knot and the brackets indicate that hinge basis function $B_j^i$ outputs the positive values of the inputs. the coefficient values $c_j^i$ and the hinge basis functions $B_j^i$ can be determined by fitting the model to empirical data collected by a plurality of test vehicles 105 operating on specified routes. $X_i$ is the ith variable of the vehicle speed data, ambient weather data, and operation data. That is, X represents all data used to determine the pressure P, and for n total variables, $X_i$ is one of the variables such that $1 \leq i \leq n$ where i, n are natural numbers. A "linear" function is a polynomial function of degree 1, i.e., a straight line. That is, the regression program is a "spline," i.e., a piecewise sum of segments of a plurality of linear functions, each linear function being a sum of a scalar multiple of a variable $X_i$ and a constant.

The multivariate adaptive regression spline algorithm captures nonlinear dependence of changes to inputs to changes to the output using piecewise fitted linear functions to generate a spline. The computer 110 can train the regression program with previously collected operation data, vehicle speed data, and ambient weather data to determine the specific weights and hinge functions for each of one or more variables based on the operation data, vehicle speed data, and ambient weather data. For example, the computer 110 can train the regression program to output the predicted pressure of the refrigerant based on input of at least some of the variables described in Table 1 below:

TABLE 1

Variables for Regression Program

| $X_i$ | Type of Data |
|---|---|
| Refrigerant Evaporation Temperature | Operation Data |
| Evaporator Target Temperature | Operation Data |
| Coolant Fan Speed | Operation Data |
| Blower Fan Speed | Operation Data |
| Ambient External Air Temperature | Weather Data |
| Temperature Difference Between Ambient External Air and Evaporator Target Temperature | Weather Data |
| Propulsion Rotation Speed | Speed Data |
| Wheel Speed | Speed Data |

Figure 3:
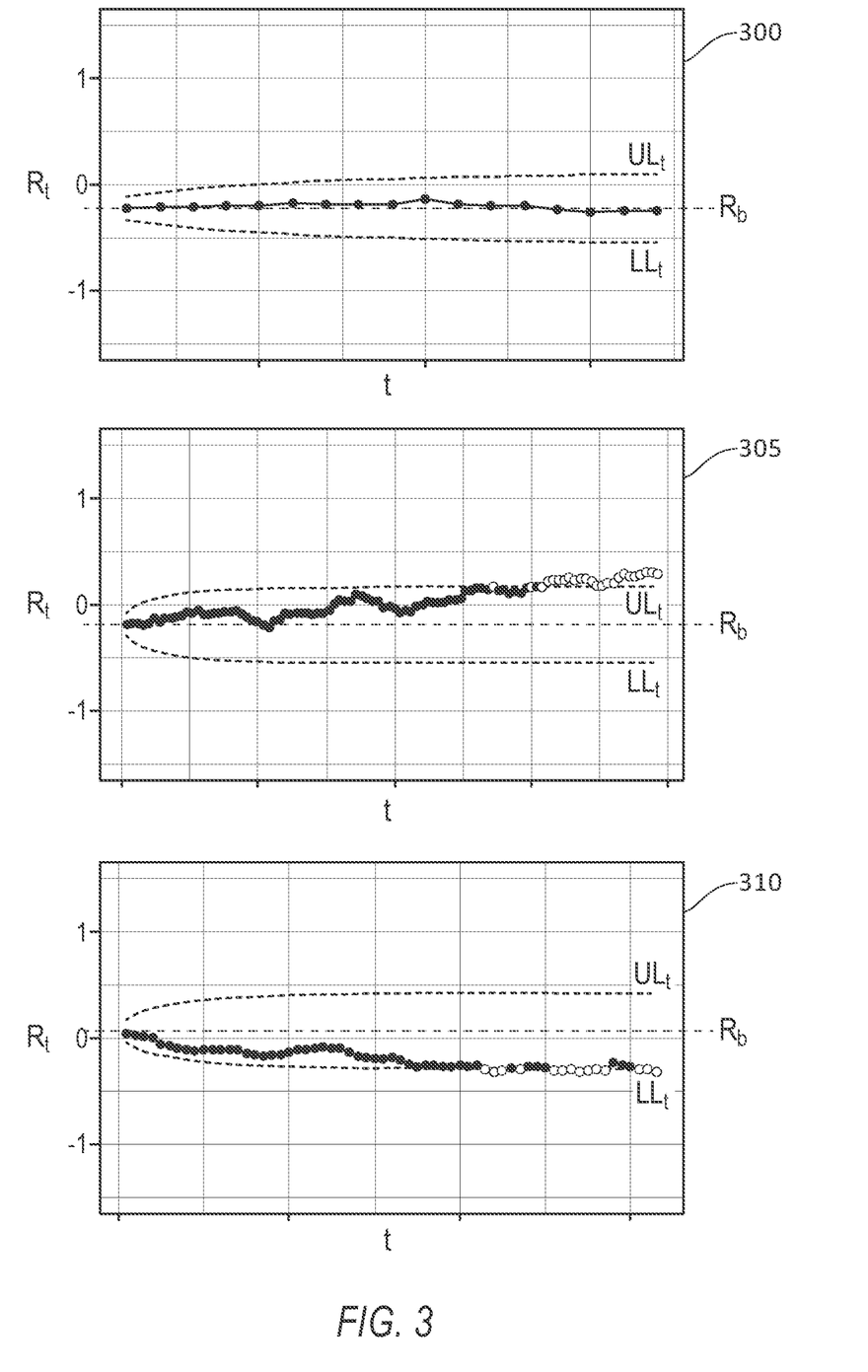
FIG. 3 is a diagram of pressure data of the climate control subsystem.

FIG. 3 includes three graphs or charts 300, 305, 310 that illustrate the computer 110 determining a baseline pressure difference of the climate control subsystem 135. A "baseline" pressure difference is an average of the differences between a predicted pressure output from the regression program and the measured actual pressure. To detect small changes in baseline pressure difference, the computer 110 determines an exponentially weighted moving average (EWMA), i.e., a recursively determined value that is based on a currently predicted pressure and a previously determined:

$$R_{b,t} = \lambda R_t + (1-\lambda) R_{b,t-1} \quad (2)$$

where t indicates a current trip at which the baseline pressure difference $R_{b,t}$ is determined, t−1 indicates a previous trip, $R_t$ is the predicted pressure difference of the refrigerant for a current trip t, $R_{b,t-1}$ is the baseline pressure difference of the previous trip t−1, and λ is a weighting factor that controls the effect of previous time pressure difference determinations on the determination of $R_{b,t}$ and affects the rate at which the computer 110 can generate false positive detections of a leak in the climate control subsystem 135 according to the regression program. The weighting factor λ can be 0.05, i.e., the regression program can be trained to output a rate of false positive identifications of a leak at most at a manufacturer-recommended 5% rate. That is, the computer 110 can generate the baseline pressure difference $R_{b,t}$ by applying a first weight value λ to the collected data $R_t$ and a second weight value 1−λ to the previously determined data $R_{b,t-1}$.

The computer 110 can update the baseline pressure difference $R_b$ of the refrigerant based on a mean pressure difference $\mu_m$ of the refrigerant over a plurality of trips. In this context, a "trip" is a specified period of time, typically from activation of the vehicle 105 to deactivation of the vehicle 105. Upon performing a plurality m of trips where m is a natural number, the computer 110 can determine a posterior baseline pressure difference $\mu_{posterior}$:

$$\mu_{posterior} = \frac{\sigma_m^2 \mu_0 + m\sigma_0^2 \mu_m}{m\sigma_0^2 + \sigma_m^2} \quad (3)$$

where $\mu_0$ is a mean of predicted pressure differences from a training set of data collected during training the regression program, $\sigma_0^2$ is a variance of predicted pressure differences from the training set of data, $\mu_m$ is a mean of predicted pressure differences for the m trips, and $\sigma_m^2$ is a variance of the predicted pressure differences for the m trips. The computer 110 can set the initial value of the baseline pressure difference $R_{b,0}=\mu_{posterior}$ prior to calculating the baseline pressure differences $R_{b,t}$ with the weighting factor $\lambda$. Thus, upon completing each trip t, the computer 110 can update the current baseline pressure difference $R_{b,t-1}$ according to weight factor $\lambda$, to the new value $R_{b,t}$ as shown above.

The computer 110 can determine a difference between the predicted pressure output from the regression program and an actual pressure measured by a pressure sensor 115. The pressure sensor 115 can measure a pressure of refrigerant exiting the compressor 200 as the "actual" pressure of the refrigerant. The difference between the predicted pressure and the actual pressure, $R_t$ is used to calculate new baseline pressure difference $R_{b,t}$. When the baseline pressure difference $R_{b,t}$ exceeds a threshold, the computer 110 can actuate a component 120 to address a leak in the climate control subsystem 135. For example, the computer 110 deactivate the compressor 200. By deactivating the compressor 200, the computer 110 can prevent unnecessary operation of the compressor 200, extending the life of the compressor 200 and reducing potential repair costs. In another example, the computer 110 can provide an alert to an occupant of the vehicle 105 indicating the leak. The computer 110 can actuate a light and/or a speaker and/or a haptic device to indicate the leak in the climate control subsystem 135. In another example, the computer 110 can send a message to an external server 130 (e.g., a server that stores diagnostic data from a plurality of vehicles 105 for a manufacturer) indicating the leak in the climate control subsystem.

The threshold can be based on a standard deviation $\sigma_0$ of a predicted output pressure P determined by inputting the training data described above to the regression program. That is, the computer 110 can determine an upper limit $UL_t$ and a lower limit $LL_t$ of the pressure based on a standard deviation $6\sigma$ and the updated baseline pressure difference $R_b$ after the first m trips, $\mu_{posterior}$ as:

$$UL_t = \mu_{posterior} + L\sigma_0 \sqrt{\frac{\lambda}{2-\lambda}(1-(1-\lambda)^{2t})} \quad (4)$$

$$LL_t = \mu_{posterior} - L\sigma_0 \sqrt{\frac{\lambda}{2-\lambda}(1-(1-\lambda)^{2t})} \quad (5)$$

where L is a control value determined to control the rate of false positive detection below a manufacturer-recommended limit. For example, when L=3, the limits $UL_t$, $LL_t$ are based on three standard deviations away from the mean $\mu_{posterior}$ FIG. 3 shows three charts 300, 305, 310 of the baseline pressure difference $R_t$ for a plurality of trips t. The vertical axis of each chart 300, 305, 310 is the EWMA value of pressure difference $R_{b,t}$, and the horizontal axis of each chart 300, 305, 310 lists the trips t performed by the vehicle 105. That is, each point on each chart 300, 305, 310 is a value of an EWMA pressure difference $R_{b,t}$ for a specific trip t. A solid point indicates that the pressure difference $R_{b,t}$ is within the limits $UL_t$, $LL_t$ of the baseline pressure difference, and an open point indicates that the pressure difference $R_{b,t}$ exceeds one of the limits $UL_t$, $LL_t$.

In the example shown in a chart 305, the pressure difference data begin to exceed the upper limit $UL_t$ for later trips. The increase in the pressure difference data indicate that the climate control subsystem 135 may typically operate at pressures exceeding the upper limit $UL_t$, indicating that the climate control subsystem 135 includes additional refrigerant than a typical climate control subsystem 135. Alternatively, the pressure difference data can fall below the lower limit $LL_t$, as shown in a chart 310. As the pressure difference data for trips approach and fall below the lower limit $LL_t$, the computer 110 can determine that that the climate control subsystem includes less refrigerant than a typical climate control subsystem 135, e.g., from a leak in the climate control subsystem 135.

The computer 110 can actuate one or more components 120 when the baseline pressure difference between the predicted pressure and the actual pressure, $R_{b,t}$, falls below the threshold (e.g., the lower limit $LL_t$) for an elapsed time exceeding a time threshold. That is, upon detecting the difference exceeding the threshold, the computer 110 can initiate a timer and measure an amount of time that the difference exceeds the threshold. If the difference returns below the threshold, the computer 110 can determine that no leak occurred and continue operation of the compressor 200. If the elapsed time since initiating the timer exceeds the time threshold, the computer 110 can determine that a leak has occurred and deactivate the compressor 200. The time threshold can be determined based on pressure data from empirical testing of climate control subsystems 135 with specific leaks. The time threshold can be an elapsed time at which the pressure difference caused by the leak remains above the threshold and does not return below the threshold, e.g., 10 seconds.

Figure 4:
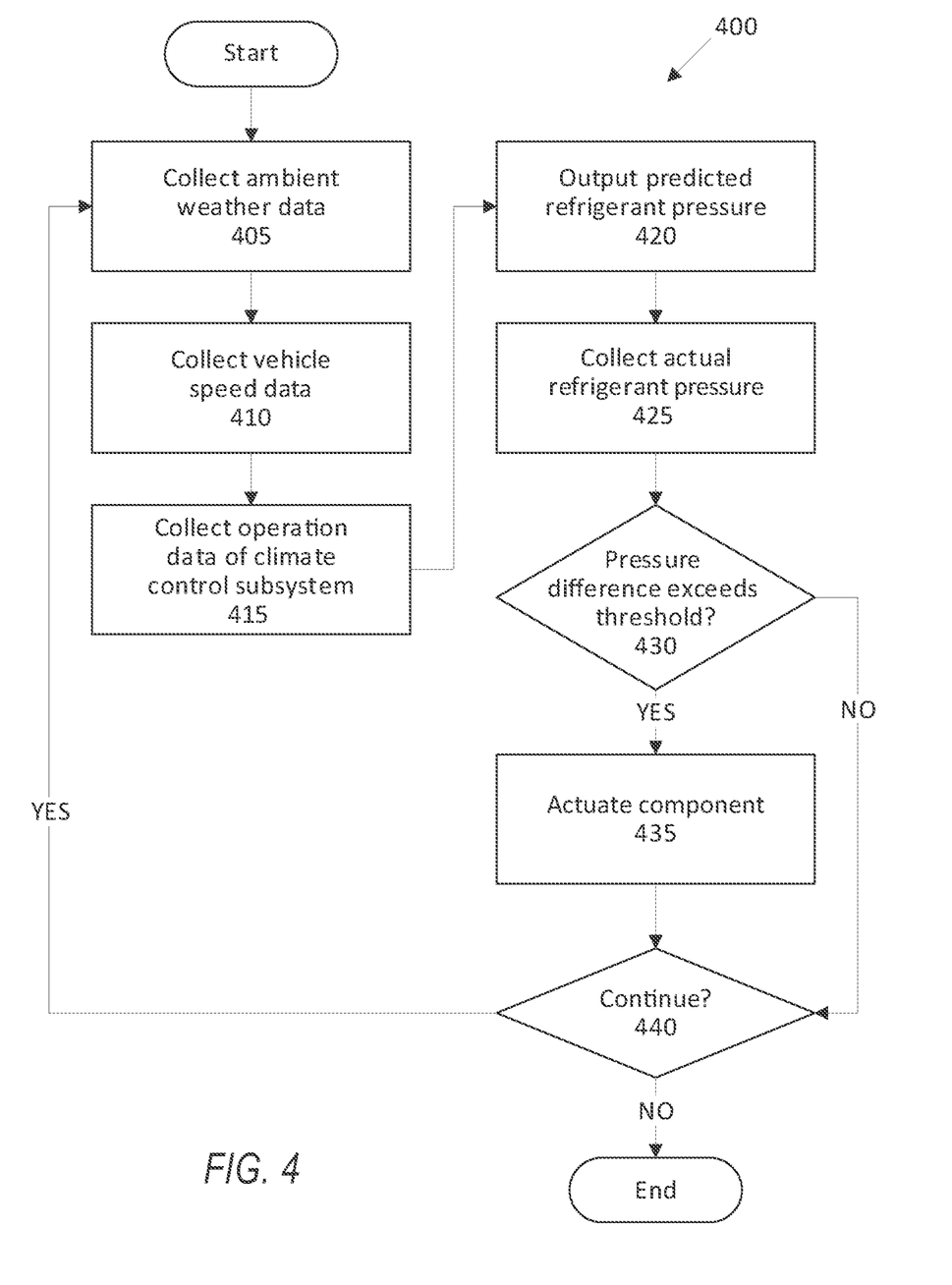
FIG. 4 is a diagram of an example process for detecting leaks in the climate control subsystem.

FIG. 4 is a diagram of an example process 400 for detecting a leak in a climate control subsystem 135 in a vehicle 105. The process 400 begins in a block 405, in which a computer 110 actuates one or more sensors 115 to collect ambient weather data. As described above, the ambient weather data can include, e.g., an ambient air temperature of air external to the vehicle, a precipitation amount, a type of precipitation, a wind speed, etc. The computer 110 can receive at least some of the ambient weather data from a server 130.

Next, in a block 410, the computer 110 collects vehicle speed data. The vehicle speed data include an engine speed and a wheel speed. That is, the computer 110 can collect revolution speed data of an internal combustion engine and revolution speed data of one of the wheels of the vehicle 105.

Next, in a block 415, the computer 110 collects operation data of the climate control subsystem 135. As described above, the computer 110 can collect data about parts of the climate control subsystem 135. The operation data can include, e.g., a refrigerant evaporation temperature, a speed of a coolant fan 210, a speed of a blower fan 230, etc.

Next, in a block 420, the computer 110 inputs the collected data to a regression program to output a predicted refrigerant pressure. As described above, the regression program can be trained to correlate the input operation, speed, and weather data to the refrigerant pressure. For example, the regression program can be a multivariable adaptive regression spline algorithm that maps nonlinear changes to the refrigerant pressure as a plurality of piecewise added linear functions.

Next, in a block 425, the computer 110 determines an actual refrigerant pressure. The computer 110 can actuate a pressure sensor 115 disposed in the climate control subsystem 135 to determine the actual refrigerant pressure. The actual refrigerant pressure can be a pressure of the refrigerant exiting the compressor 200.

Next, in a block 430, the computer 110 determines whether a difference between the predicted refrigerant pressure and the actual refrigerant pressure exceeds a threshold. As described above, the threshold can be a maximum deviation from a baseline pressure difference determined from previously collected pressure data. If the difference between the predicted refrigerant pressure and the actual refrigerant pressure falls below the threshold, the process 400 continues in a block 435. Otherwise, the process 400 continues in a block 440

In the block 435, the computer 110 actuates one or more components 120. For example, the computer 110 can deactivate a compressor 200 of the climate control subsystem 135. Because the compressor 200 compresses the refrigerant, the compressor 200 may operate at a higher rate to compress the leaking refrigerant to the specified pressure. By deactivating the compressor 200, the computer 110 can prevent unnecessary operation of the compressor 200, extending the life of the compressor 200 and reducing potential repair costs. In another example, the computer 110 can actuate a speaker and/or a light to provide an audio and/or visual alert to an occupant of the vehicle 105.

In the block 440, the computer 110 determines whether to continue the process 400. For example, if the computer 110 has deactivated the compressor 200, the computer 110 can determine not to continue the process 400. If the computer 110 determines to continue, the process 400 returns to the block 405. Otherwise, the process 400 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The invention claimed is:

1. A system, comprising a computer including a processor and a memory, the memory storing instructions executable by the processor to:
    collect (a) ambient weather data, (b) vehicle speed data including at least one of a vehicle speed or an engine speed, and (c) operation data of a climate control subsystem of a vehicle;
    input the collected data to a regression program trained to output a predicted pressure of refrigerant of the climate control subsystem, the regression program trained with previously determined ambient weather data, data of a previous vehicle speed or a previous engine speed, and previous operation data of the climate control subsystem;
    determine an actual pressure of the refrigerant in the climate control subsystem; and
    actuate a component upon determining that a difference between the predicted pressure and the actual pressure falls below a threshold,
    wherein the instructions further include instructions to:
    output the predicted pressure based on a plurality of previously predicted pressure differences of the refrigerant of the climate control subsystem; and
    determine each of the plurality of previously predicted pressure differences as a respective average of predicted pressure differences during a previous respective trip, each trip being a time period between activation of the vehicle and deactivation of the vehicle.

2. The system of claim 1, wherein the instructions further include instructions to retrain the regression program with the collected data and the previously determined data by applying a first weight value to the collected data and a second weight value to the previously determined data, the first weight value being greater than the second weight value.

3. The system of claim 1, wherein the threshold is based on a standard deviation of the plurality of previously predicted pressure differences from a mean value of the previously predicted pressure differences.

4. The system of claim 3, wherein the threshold is further based on a false positive rate of the predicted pressure indicating a leak of the refrigerant in the climate control subsystem.

5. The system of claim 1, wherein the instructions further include instructions to determine the difference between the predicted pressure and the actual pressure as indicating a leak in the climate control subsystem based on the threshold being determined to control a statistical rate of false positive leak detection.

6. The system of claim 1, wherein the operation data of the climate control subsystem includes a blower fan speed and an evaporation temperature of the refrigerant.

7. The system of claim 1, wherein the instructions further include instructions to determine a baseline pressure difference of the refrigerant of the climate control subsystem based on the previous operation data of the climate control subsystem.

8. A system, comprising a computer including a processor and a memory, the memory storing instructions executable by the processor to:
collect (a) ambient weather data, (b) vehicle speed data including at least one of a vehicle speed or an engine speed, and (c) operation data of a climate control subsystem of a vehicle;
input the collected data to a regression program trained to output a predicted pressure of refrigerant of the climate control subsystem, the regression program trained with previously determined ambient weather data, data of a previous vehicle speed or a previous engine speed, and previous operation data of the climate control subsystem;
determine an actual pressure of the refrigerant in the climate control subsystem; and
actuate a component upon determining that a difference between the predicted pressure and the actual pressure falls below a threshold, wherein the instructions further include instructions to:
determine a baseline pressure difference of the refrigerant of the climate control subsystem based on the previous operation data of the climate control subsystem; and
update the baseline pressure difference of the refrigerant based on a mean pressure difference between the predicted pressure of the refrigerant and the actual pressure of the refrigerant from activation of the vehicle to deactivation of the vehicle.

9. The system of claim 1, wherein the instructions further include instructions to actuate the component when the difference between the predicted pressure and the actual pressure exceeds the threshold for an elapsed time exceeding a time threshold.

10. The system of claim 1, wherein the regression program is a multivariate adaptive regression spline.

11. The system of claim 1, wherein the instructions to actuate the component include instructions to deactivate a compressor of the climate control subsystem.

12. A method, comprising:
collecting (a) ambient weather data, (b) vehicle speed data including at least one of a vehicle speed or an engine speed, and (c) operation data of a climate control subsystem of a vehicle;
inputting the collected data to a regression program trained to output a predicted pressure of refrigerant of the climate control subsystem, the regression program trained with previously determined ambient weather data, data of a previous vehicle speed or a previous engine speed, and previous operation data of the climate control subsystem;
determining an actual pressure of the refrigerant in the climate control subsystem; and
actuating a component upon determining that a difference between the predicted pressure and the actual pressure falls below a threshold,
wherein the method further comprises:
outputting the predicted pressure based on a plurality of previously predicted pressures of the refrigerant of the climate control subsystem; and
determining each of the plurality of previously predicted pressures as a respective average of predicted pressures during a previous respective trip, each trip being a time period between activation of the vehicle and deactivation of the vehicle.

13. The method of claim 12, further comprising retraining the regression program with the collected data and the previously determined data by applying a first weight value to the collected data and a second weight value to the previously determined data, the first weight value being greater than the second weight value.

14. The method of claim 12, wherein the threshold is based on a standard deviation of the plurality of previously predicted pressures from a mean value of the previously predicted pressures.

15. The method of claim 12, further comprising determining the difference between the predicted pressure and the actual pressure as indicating a leak in the climate control subsystem based on the threshold being determined to control a statistical rate of false positive leak detection.

16. The method of claim 12, further comprising deactivating a compressor of the climate control subsystem upon determining that the difference between the predicted pressure and the actual pressure falls below the threshold.

* * * * *